(12) United States Patent
Maruyama et al.

(10) Patent No.: US 9,903,023 B2
(45) Date of Patent: Feb. 27, 2018

(54) HOT ROLLED STEEL SHEET AND METHOD FOR MANUFACTURING THE SAME

(71) Applicant: NIPPON STEEL & SUMITOMO METAL CORPORATION, Tokyo (JP)

(72) Inventors: Naoki Maruyama, Tokyo (JP); Tatsuo Yokoi, Tokyo (JP); Hiroyuki Tanahashi, Tokyo (JP); Atsushi Seto, Tokyo (JP); Atsushi Itami, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 351 days.

(21) Appl. No.: 14/430,410

(22) PCT Filed: Sep. 26, 2013

(86) PCT No.: PCT/JP2013/076027
§ 371 (c)(1),
(2) Date: Mar. 23, 2015

(87) PCT Pub. No.: WO2014/050954
PCT Pub. Date: Apr. 3, 2014

(65) Prior Publication Data
US 2015/0218708 A1    Aug. 6, 2015

(30) Foreign Application Priority Data
Sep. 27, 2012  (JP) .................................. 2012-213728

(51) Int. Cl.
*C22C 38/02*   (2006.01)
*C22C 38/06*   (2006.01)
(Continued)

(52) U.S. Cl.
CPC ............ *C23C 30/005* (2013.01); *B32B 15/01* (2013.01); *C21D 6/001* (2013.01); *C21D 6/002* (2013.01);
(Continued)

(58) Field of Classification Search
None
See application file for complete search history.

(56) References Cited

U.S. PATENT DOCUMENTS

2006/0113012 A1   6/2006   Okamoto et al.

FOREIGN PATENT DOCUMENTS

EP    2 098 600 A1   9/2009
EP    2 202 327 A1   6/2010
(Continued)

OTHER PUBLICATIONS

Machine-English translation of JP2012-021192, Maruyama Naoki et al., Feb. 2, 2012.*

(Continued)

*Primary Examiner* — Deborah Yee
(74) *Attorney, Agent, or Firm* — Birch, Stewart, Kilpatrick & Birch, LLP

(57) ABSTRACT

A hot rolled steel sheet consisting of, in mass %, C: 0.05% to 0.15%, Si: 0% to 0.2%, Al: 0.5% to 3.0%, Mn: 1.2% to 2.5%, P: 0.1% or less, S: 0.01% or less, N: 0.007% or less, Ti: 0.03% to 0.10%, Nb: 0.008% to 0.06%, V: 0% to 0.12%, one or more of Cr, Cu, Ni, and Mo: 0% to 2.0% in total, B: 0% to 0.005%, one or more of Ca, Mg, La, and Ce: 0% to 0.01% in total, total amount of Si and Al: $0.8 \times (Mn-1)$% or more, total amount of Ti and Nb: 0.04% to 0.14%, and the balance: Fe and impurities. In a structure of steel, a total area ratio of martensite and retained austenite is 3% to 20%, an area ratio of ferrite is 50% to 96%, and an area ratio of pearlite is 3% or less. In a superficial layer part, the thickness in a sheet thickness direction of a region in which a network-like oxide is present is less than 0.5 μm, and a maximum tensile strength is 720 MPa or more.

12 Claims, 1 Drawing Sheet

(51) Int. Cl.
*C22C 38/12* (2006.01)
*C22C 38/14* (2006.01)
*C21D 9/46* (2006.01)
*C21D 8/02* (2006.01)
*C23C 30/00* (2006.01)
*C22C 38/00* (2006.01)
*C22C 38/04* (2006.01)
*B32B 15/01* (2006.01)
*C21D 6/00* (2006.01)
*C22C 38/08* (2006.01)
*C22C 38/16* (2006.01)
*C22C 38/22* (2006.01)
*C22C 38/24* (2006.01)
*C22C 38/26* (2006.01)
*C22C 38/28* (2006.01)
*C22C 38/38* (2006.01)
*C21D 8/04* (2006.01)
*C23C 2/02* (2006.01)
*C23C 2/06* (2006.01)
*C23C 2/28* (2006.01)

(52) U.S. Cl.
CPC .............. *C21D 6/005* (2013.01); *C21D 6/008* (2013.01); *C21D 8/0221* (2013.01); *C21D 8/0263* (2013.01); *C21D 8/0278* (2013.01); *C21D 8/0426* (2013.01); *C21D 8/0463* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/24* (2013.01); *C22C 38/26* (2013.01); *C22C 38/28* (2013.01); *C22C 38/38* (2013.01); *C23C 2/02* (2013.01); *C23C 2/06* (2013.01); *C23C 2/28* (2013.01); *C21D 2211/001* (2013.01); *C21D 2211/004* (2013.01); *C21D 2211/005* (2013.01); *C21D 2211/008* (2013.01); *Y10T 428/12972* (2015.01)

(56) References Cited

FOREIGN PATENT DOCUMENTS

| | | |
|---|---|---|
| EP | 2 258 886 A1 | 12/2010 |
| JP | 5-179346 A | 7/1993 |
| JP | 10-280096 A | 10/1998 |
| JP | 2002-317246 A | 10/2002 |
| JP | 2004-204326 A | 7/2004 |
| JP | 2005-120436 A | 5/2005 |
| JP | 2005-298924 A | 10/2005 |
| JP | 2006-169611 A | 6/2006 |
| JP | 2006-169615 A | 6/2006 |
| JP | 2007-009322 A | 1/2007 |
| JP | 2007-023339 A | 2/2007 |
| JP | 2007-321201 A | 12/2007 |
| JP | 2008-266726 A | 11/2008 |
| JP | 2010-159672 A | 7/2010 |
| JP | 2012-021192 A | 2/2012 |

OTHER PUBLICATIONS

Machine-English translation of JP2003-171752, Fujita Nobuhiro et al., Jun. 20, 2003.*
Extended European Search Report, dated Feb. 12, 2016, for European Application No. 13841281.2.
Korean Office Action, dated Jan. 14, 2016, for corresponding Korean Application No. 10-2015-7007425, with a partial English translation.
International Search Report issued in PCT/JP2013/076027, dated Dec. 24, 2013.
Office Action issued in Taiwanese Patent Application No. 102134757, dated Aug. 29, 2014.
Written Opinion issued in PCT/J132013/076027, dated Dec. 24, 2013.

* cited by examiner

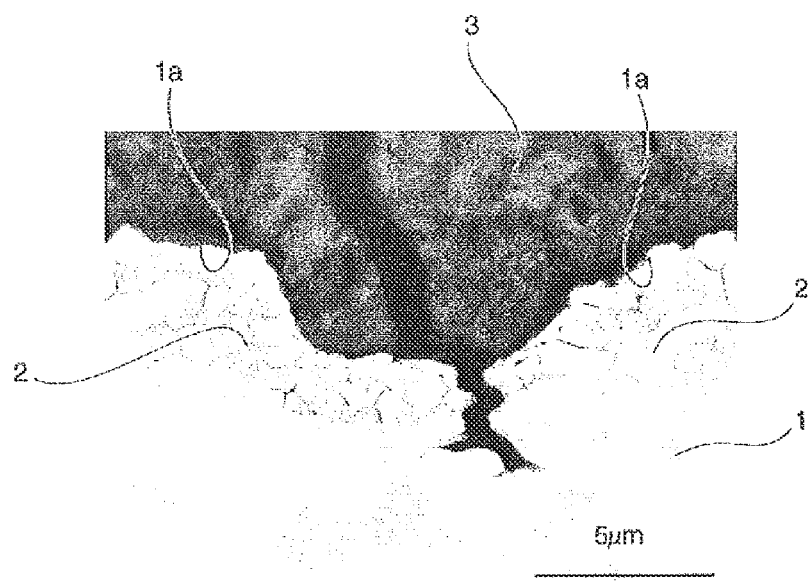

HOT ROLLED STEEL SHEET AND METHOD FOR MANUFACTURING THE SAME

TECHNICAL FIELD

The present invention relates to a hot rolled steel sheet having a tensile strength of 720 MPa or more with excellent corrosion resistance after electrodeposition coating, fatigue characteristics, and bendability, and a method for manufacturing the hot rolled steel sheet. The present invention particularly relates to a hot rolled steel sheet and a method for manufacturing the hot rolled steel sheet, the hot rolled steel sheet being favorably used as a material of frames, members, suspension arms, wheels, and the like of automobiles or trucks, on which electrodeposition coating is performed, and as an architectural material and a material of industrial machinery.

BACKGROUND ART

A hot rolled steel sheet is usually used for a member of an automobile or a truck, such as a chassis or a wheel, and is required to have bendability and high fatigue durability.

As a method for increasing the formability and fatigue characteristics of a hot rolled steel sheet, the following methods are disclosed. As shown in Patent Documents 1 to 3, there are methods for dispersing structures including hard martensite in a metal structure mainly including soft ferrite so as to make a so-called dual-phase steel. In these methods, an alloy element such as Si or Al, which has an effect of promoting the formation of ferrite during cooling after final rolling in a hot rolling process, is added.

However, in a case in which steels disclosed in Patent Documents 1 to 3 are manufactured in a real operation line, in some cases, favorable bending fatigue characteristics are not obtained stably. Further, as for a steel to which Si is added, unfortunately, there are cases in which coating corrosion resistance obtained after electrodeposition coating (hereinafter also simply referred to as "coating corrosion resistance" or "corrosion resistance after coating") is not secured and cases in which bending fatigue characteristics are not obtained as expected because the surface roughness of a steel sheet becomes large.

Further, a steel sheet that is used for chassis or wheels of automobiles or trucks is also required to have fatigue characteristics of a punched part. This is because the roughness of an end surface formed by punching with shears or a punch usually has a larger roughness than the surface of a steel sheet, and the punched end surface becomes the position where a fatigue crack is generated preferentially.

As a method to solve the above problems, for example, Patent Documents 4 and 5 disclose a high-strength hot rolled steel sheet in which damage of the punched end surface is prevented.

Further, Patent Documents 6 and 7 disclose steel sheets having high notch fatigue strength. In the steel sheets, the main structure is ferrite and bainite.

Patent Document 8 discloses a method for largely decreasing the roughness of the punched fracture surface and notably preventing the generation of a fatigue crack from the punched part by making a structure in which appropriate amounts of martensite and retained austenite are dispersed while the strength is increased by using precipitation strengthening of an alloy carbide using, as a base, a metal structure including ferrite as a main phase.

Furthermore, Patent Document 9 discloses a steel sheet having high coating adhesion and punching fatigue characteristics while the strength is increased by using, as a metal structure including a ferrite phase as a main phase, a martensite and bainite structure.

PRIOR ART DOCUMENT(S)

Patent Document(s)

[Patent Document 1] JP H10-280096A
[Patent Document 2] JP 2007-321201A
[Patent Document 3] JP 2007-9322A
[Patent Document 4] JP 2005-298924A
[Patent Document 5] JP 2008-266726A
[Patent Document 6] JP H05-179346A
[Patent Document 7] JP 2002-317246A
[Patent Document 8] JP 2010-159672A
[Patent Document 9] JP 2012-021192A

SUMMARY OF THE INVENTION

Problem(s) to be Solved by the Invention

However, in a case of steel sheets disclosed in Patent Documents 4 and 5, the improvement in the roughness of the punched end surface by using these methods is not sufficient to improve fatigue characteristics, and in some cases, coating corrosion resistance is not obtained.

Further, in a case of steel sheets disclosed in Patent Documents 6 and 7, in some cases, bending fatigue characteristics and corrosion resistance after coating become inferior. In addition, since the yield ratio is high, stretch formability is not always sufficient.

Furthermore, in a case of a steel sheet disclosed in Patent Document 8, in some cases, the limit of bending fatigue characteristics is low in the original plate and the punched part. Further, when electrodeposition coating is performed after pickling, favorable corrosion resistance after coating is not always obtained. Furthermore, when bending or a composite formation process of reduction in area and bending is performed, in some cases, a break is generated and fatigue characteristics of members are decreased after the formation.

Further, Patent Document 9 has problems in the generation of scale strip or a break and in bending fatigue of a base material in a case in which a heavy process such as reduction in area is performed on the steel sheet in order mainly to improve coating adhesion of a black scale material.

From the above reasons, a technique to secure corrosion resistance after electrodeposition coating and to have excellent bending fatigue characteristics of a base material and excellent fatigue characteristics of a punched part is required to be developed for a high-strength hot rolled steel sheet having high formability. In particular, a pickled sheet is often bent to be used, so that bendability is important.

The present invention has been made in view of the above problems, and aims to provide a hot rolled steel sheet and a method for manufacturing the hot rolled steel sheet, the hot rolled steel sheet being able to obtain favorable corrosion resistance, fatigue characteristics of a base material, and fatigue characteristics of a punched part, and also having favorable bendability, even in a case in which electrodeposition coating is performed on a high-strength hot rolled steel sheet having a maximum tensile strength of 720 MPa or more.

Means for Solving the Problem(s)

The present inventors first focused on a hot rolled steel sheet having a maximum tensile strength of 720 MPa or more by which the weight of members can be expected to be reduced largely, and studied a method for reducing the roughness of the punched end surface. Accordingly, the present inventors have found out that the roughness of the punched fracture surface is reduced largely and the generation of fatigue cracks from the punched part is notably prevented by making a structure in which appropriate amounts of martensite and retained austenite are dispersed, while the strength is increased by using precipitation strengthening of an alloy carbide, typified by TiC and NbC, using, as a base, a metal structure including ferrite as a main phase. Further, the present inventors have confirmed that excellent stretch formability of a dual phase steel can be secured, even when using precipitation strengthening of an alloy carbide.

In order to obtain the above metal structure including ferrite as a main phase, it is useful to add appropriate amounts of Si, Al, and Mn. However, when the corrosion resistance of the hot rolled steel sheet was evaluated after electrodeposition coating, it was found out that the corrosion resistance became inferior in some cases. Accordingly, the present inventors studied its factor and revealed that a network-like oxide containing one or more of Si, Al, Mn, and Fe, which are present in a superficial layer part of a base material, has an influence on the corrosion resistance after electrodeposition coating. Also, the present inventors have found out the conditions under which favorable corrosion resistance can be obtained by optimizing the amount ratio of Si, Al, and Mn in this case.

The present inventors and the like further observed the metal structure in detail in order to reveal the factor of degradation of fatigue characteristics, which can be observed in a dual-phase steel containing Si, Al, and Mn in some cases. Accordingly, the present inventors have found out that, in a case in which a network-like oxide 2 containing one or more of Si, Al, Mn, and Fe is present immediately under a surface 1a (in the superficial layer part of) of a base material 1 as shown in FIG. 1, fatigue characteristics are degraded by the network-like oxide 2 serving as a starting point of a fatigue fracture. Note that FIG. 1 shows are a state of a hot rolled steel sheet with scale, in which black scale (scale) 3 is attached to the surface 1a of the base material 1. In the superficial layer part (a region of a predetermined range from the surface 1a of the base material 1 toward the inside of the base material 1) of the base material 1, the network-like oxide 2 containing one or more of Si, Al, Mn, and Fe is precipitated along a crystal grain boundary of base material 1. In the present invention, "network-like oxide" refers to the oxide 2 containing one or more of Si, Al, Mn, and Fe precipitated along the crystal grain boundary of base material 1 in the superficial layer part of the base material 1 in this manner.

Further, the present inventors and the like studied the factor by which bendability is degraded by using a hot rolled steel sheet from which scale has been removed by pickling. Accordingly, the present inventors have found out that the bendability is degraded when excessive network-like oxides containing one or more of Si, Al, Mn, and Fe remains in the superficial layer part of the steel sheet. Although this factor has not been defined yet, this is considered to be because the presence of an oxide in the grain boundary decreases the grain boundary strength, and that part serves as the starting point of the generation of a crack at the time of a bending test.

The present inventors and the like intensively studied a method for preventing the formation of this network-like oxide containing one or more of Si, Al, Mn, and Fe. Accordingly, the present inventors have found out that the formation of this oxide can be prevented by optimizing the addition amounts of Mn, Al, Si, Ti, Nb, and the like and by suppressing remaining water on the surface of a steel sheet (water that is present on the surface of the steel sheet), rolling conditions, and cooling conditions at the time of hot-rolling.

The intensive studies by the present inventors were based on experimental results. Accordingly, the present inventors have found out that the formation of an oxide containing one or more of Si, Al, Mn, and Fe, present in a network shape in the superficial layer part of a base material, can be prevented by adding martensite and retained austenite to a metal structure mainly including precipitation-strengthened ferrite and by optimizing the addition amounts of alloy elements. As a result, the present inventors have completed a high-strength hot rolled steel sheet having a tensile strength of 720 MPa or more with excellent fatigue characteristics of a punched part, stable bending fatigue characteristics, and further, excellent corrosion resistance after electrodeposition coating while favorable bending formability, favorable bendability for reduction in area, and favorable stretch formability are secured. That is to say, the summary of the present invention is as follows.

[1]

A hot rolled steel sheet consisting of, in mass %,
C: 0.05% to 0.15%,
Si: 0% to 0.2%,
Al: 0.5% to 3.0%,
Mn: 1.2% to 2.5%,
P: 0.1% or less,
S: 0.01% or less,
N: 0.007% or less,
Ti: 0.03% to 0.10%,
Nb: 0.008% to 0.06%,
V: 0% to 0.12%,
one or more of Cr, Cu, Ni, and Mo: 0% to 2.0% in total,
B: 0% to 0.005%,
one or more of Ca, Mg, La, and Ce: 0% to 0.01% in total,
total amount of Si and Al: 0.8×(Mn−1)% or more,
total amount of Ti and Nb: 0.04% to 0.14%, and
the balance: Fe and impurities,
wherein, in a structure of steel, a total area ratio of martensite and retained austenite is 3% to 20%, an area ratio of ferrite is 50% to 96%, and an area ratio of pearlite is 3% or less, and
wherein, in a superficial layer part, the thickness in a sheet thickness direction of a region in which a network-like oxide is present is less than 0.5 μm, and a maximum tensile strength is 720 MPa or more.

[2]

The hot rolled steel sheet according to [1],
wherein an average grain diameter of an alloy carbide containing Ti and an alloy carbide containing Nb is 10 nm or less.

[3]

The hot rolled steel sheet according to [1] or [2],
wherein a yield ratio is 0.82 or less.

[4]

The hot rolled steel sheet according to any one of [1] to [4], consisting of, in mass %,
Si: 0.001% to 0.2%.

[5]

The hot rolled steel sheet according to any one of [1] to [4], consisting of, in mass %,
V: 0.01% to 0.12%.

[6]
The hot rolled steel sheet according to any one of [1] to [5], consisting of, in mass %,
one or more of Cr, Cu, Ni, and Mo: 0.02% to 2.0% in total.

[7]
The hot rolled steel sheet according to any one of [1] to [6], consisting of, in mass %,
B: 0.0003% to 0.005%.

[8]
The hot rolled steel sheet according to any one of [1] to [7], consisting of, in mass %,
one or more of Ca, Mg, La, and Ce: 0.0003% to 0.01% in total.

[9]
The hot rolled steel sheet according to any one of [1] to [8],
wherein a surface is plated or alloyed-plated.

[10]
A method for manufacturing a hot rolled steel sheet, the method including:
heating a slab consisting of, in mass %,
C: 0.05% to 0.15%,
Si: 0% to 0.2%,
Al: 0.5% to 3.0%,
Mn: 1.2% to 2.5%,
P: 0.1% or less,
S: 0.01% or less,
N: 0.007% or less,
Ti: 0.03% to 0.10%,
Nb: 0.008% to 0.06%,
V: 0% to 0.12%,
one or more of Cr, Cu, Ni, and Mo: 0% to 2.0% in total,
B: 0% to 0.005%,
one or more of Ca, Mg, La, and Ce: 0% to 0.01% in total,
total amount of Si and Al: 0.8×(Mn−1)% or more,
total amount of Ti and Nb: 0.04% to 0.14%, and
the balance: Fe and impurities, and sequentially performing rough rolling and final rolling;
holding, from when descaling is performed before the final rolling until when the final rolling is finished, for three seconds or more, a state in which water is not present on a surface of the steel sheet, and setting a finishing temperature of the final rolling to be 850° C. or more;
performing cooling in which an average cooling speed between the finishing temperature of the final rolling and an $Ar_3$ temperature is 25° C./s or more, an average cooling speed between the $Ar_3$ temperature and 730° C. is 30° C./s or more, an average cooling speed between 730° C. and 670° C. is 12° C./s or less, and an average cooling speed between 670° C. and 550° C. is 20° C./s or more; and rolling up the hot rolled steel sheet at 530° C. or less.

[11]
A method for manufacturing a hot rolled steel sheet, the method comprising:
pickling the hot rolled steel sheet obtained with the method according to [10], and then heating the hot rolled steel sheet at 800° C. or less and immersing the hot rolled steel sheet in a plating bath.

[12]
The method for manufacturing a hot rolled steel sheet according to [11], the method further including:
performing alloying treatment on a plated layer.

Effect(s) of the Invention

According to the hot rolled steel sheet of the present invention, by the above configuration, it becomes possible to obtain excellent bending formability, coating corrosion resistance, bending fatigue characteristics of a base material, and fatigue characteristics of a punched part. In conventional steel sheets, the sheet thickness of components has been set by taking into account the reduction in thickness by corrosion. By contrast, the hot rolled steel sheet of the present invention has excellent coating corrosion resistance, and accordingly, it becomes possible to reduce the sheet thickness of components so as to reduce the weight of automobiles, trucks, or the like. Further, even when conventional steel sheets are processed to have high strength, the fatigue strength of the punched part is not substantially improved. By contrast, the hot rolled steel sheet of the present invention has excellent bending fatigue characteristics and fatigue characteristics of the punched part, and accordingly, it is suitably used to reduce the weight of members.

Furthermore, according to the manufacturing method of the present invention, the addition amounts of alloy elements are optimized and the conditions at the time of hot-rolling are controlled, and accordingly, it becomes possible to manufacture a hot rolled steel sheet having a maximum tensile strength of 720 MPa with excellent bendability, corrosion resistance after electrodeposition coating, and fatigue durability.

BRIEF DESCRIPTION OF THE DRAWING(S)

FIG. 1 is a microscope photograph of a periphery of a superficial layer part of a dual phase steel sheet containing Si, Al, and Mn. Note that FIG. 1 shows a state of a hot rolled steel sheet with scale, in which black scale (scale) is attached to a surface of a base material.

MODE(S) FOR CARRYING OUT THE INVENTION

Hereafter, an embodiment of a hot rolled steel sheet and a method for manufacturing the same according to the present invention will be described in detail. It should be noted that the present embodiment is described in detail so that the spirit of the hot rolled steel sheet and the method for manufacturing the same according to the present invention can be understood more clearly. Therefore, the present embodiment shall not limit the present invention.

[Hot-Rolled Steel Sheet]
A hot rolled steel sheet according to an embodiment of the present invention consists of, in mass %,
C: 0.05% to 0.15%,
Si: 0% to 0.2%,
Al: 0.5% to 3.0%,
Mn: 1.2% to 2.5%,
P: 0.1% or less,
S: 0.01% or less,
N: 0.007% or less,
Ti: 0.03% to 0.10%,
Nb: 0.008% to 0.06%,
V: 0% to 0.12%,
one or more of Cr, Cu, Ni, and Mo: 0% to 2.0% in total,
B: 0% to 0.005%,
one or more of Ca, Mg, La, and Ce: 0% to 0.01% in total,
total amount of Si and Al: 0.8×(Mn−1)% or more,
total amount of Ti and Nb: 0.04% to 0.14%, and
the balance: Fe and impurities,
in a structure of steel, a total area ratio of martensite and retained austenite is 3% to 20%,
an area ratio of ferrite is 50% to 96%, and an area ratio of pearlite is 3% or less, and in a superficial layer part, the thickness in the sheet thickness direction of a region in which a network-like oxide is present is less than 0.5 μm, and the maximum tensile strength is 720 MPa or more.

The reasons of the limitation of the constituents of the steel material according to the present embodiment will be described below.

<Steel Constituents>

The steel constituents of the hot rolled steel sheet of the present invention will be described. It should be noted that the representation of % regarding the steel constituents means mass % unless otherwise specified.

"C: Carbon" 0.05% to 0.15%

In the present invention, C is used for structure control. When the content of C is less than 0.05%, it becomes difficult to secure a total area ratio of martensite and retained austenite of 3% or more. Further, when the content of C exceeds 0.15%, a structure of pearlite appears and fatigue characteristics are decreased in a punched part. Accordingly, in the present disclosure, the appropriate range of C is limited to a range of 0.05% to 0.15%. Note that the lower limit of the content of C is preferably set to be 0.055%, more preferably 0.06%. Further, the upper limit of the content of C is preferably set to be 0.14%, more preferably 0.13%.

"Si: Silicon" 0% to 0.2%

In the present invention, Si is not necessarily contained; however, by containing Si, the ferrite fraction can be increased. Still, when the content of Si exceeds 0.2%, the network-like oxide is increased in the superficial layer part, and accordingly, dense zinc phosphate crystals (an electrodeposition coating base film) are not formed in chemical conversion coating in an electrodeposition coating step. As a result, the adhesion between the steel sheet and the coating material becomes poor after electrodeposition coating, and it becomes difficult to secure corrosion resistance after electrodeposition coating. Further, a large number of Si—Mn oxides are formed in the superficial layer part during a hot-rolling process, which degrades fatigue characteristics and bendability. This is why the appropriate range is set to be 0.2% or less. The content of Si is preferably set to be 0.18% or less, more preferably 0.15% or less. The lower limit of the content of Si is not limited to a particular value, but the content of less than 0.001% increases the manufacturing cost, so that 0.001% or more is preferable.

"Al: Aluminum" 0.5% to 3.0%

Al is an element that increases the ferrite fraction like Si. When the content of Al is less than 0.5%, the ferrite fraction cannot be secured, and accordingly, the strength, the formability, and fatigue characteristics of the punched end surface cannot be secured. On the other hand, when the content of Al exceeds 3.0%, a large number of oxides containing Al and Mn are formed in the superficial layer part, and accordingly, fatigue characteristics and bendability are degraded. This is why the appropriate range is set to be 0.5% to 3.0%. Note that the lower limit of the content of Al is preferably set to be 0.6%. Further, the upper limit of the content of Al is preferably set to be 2.0%, more preferably 1.5%.

"Mn: Manganese" 1.2% to 2.5%

Mn is used in order to control the structure and adjust the strength. When the content of Mn is less than 1.2%, it becomes difficult to secure a total area ratio of martensite and retained austenite of 3% or more, and fatigue characteristics of the punched part are decreased. On the other hand, when the content of Mn exceeds 2.5%, it becomes difficult to secure an area ratio of ferrite of 50% or more, and fatigue characteristics of the punched part are decreased. Further, the thickness of the network-like oxide is increased, so that bending fatigue characteristics are decreased. This is why the appropriate range is set as 1.2% to 2.5%. Note that the lower limit of the content of Mn is preferably set to be 1.3%, more preferably 1.5%. Further, the upper limit of the content of Mn is preferably set to be 2.4%, more preferably 2.3%.

"P: Phosphorus" 0.1% or Less

P can be used to secure the strength of steel. However, when the content of P exceeds 0.1%, the roughness of the punched end surface is increased and fatigue characteristics of the punched part are degraded, so that the appropriate range of P is set to be 0.1% or less. The lower limit of the content of P is not limited to a particular value, and may be 0%, but the content of less than 0.001% increases the manufacturing cost; accordingly, 0.001% is a substantial lower limit. Note that the content of P is preferably set to be 0.05% or less, more preferably 0.03% or less.

"S: Sulfur" 0.01% or Less

S is an element that has an influence on fatigue characteristics of the base material. However, when the content of S exceeds 0.01%, the roughness of the punched fracture surface is increased and favorable fatigue characteristics of the punched part are not obtained, so that the appropriate range is set to be 0.01% or less. Further, the lower limit of the content of S is not limited to a particular value, and may be 0%, but the content of less than 0.0002% increases the manufacturing cost; accordingly, 0.0002% is a substantial lower limit. Note that the content of S is preferably set to be 0.006% or less, more preferably 0.003% or less.

"N: Nitrogen" 0.007% or Less

When the content of N exceeds 0.007%, a coarse Ti—Nb-based nitride is formed, and the formation of Ti and Nb alloy carbides is prevented, so that the maximum tensile strength of 720 MPa cannot be obtained. Accordingly, the upper limit is set to be 0.007%. Further, the lower limit of the content of N is not limited to a particular value, and may be 0%, but the content of less than 0.0003% increases the manufacturing cost; accordingly, 0.0003% is a substantial lower limit Note that the content of N is preferably set to be 0.006% or less, more preferably 0.005% or less.

"Ti: Titanium" 0.03% to 0.10%

Ti is used to perform precipitation strengthening of steel. Further, Ti is effective in preventing the formation of the network-like oxide formed in the superficial layer part during a hot-rolling step. However, when the content of Ti is less than 0.03%, there is no effect of preventing the formation of the network-like oxide, and further, it becomes difficult to secure the tensile strength of 720 MPa or more. Further, when the content of Ti exceeds 0.10%, the effect saturates, the roughness of the punched part is increased, fatigue characteristics of the punched part are decreased, a yield ratio YR is increased, and the formability is decreased. Accordingly, the appropriate range is limited to 0.03% to 0.10%. Note that the lower limit of the content of Ti is preferably set to be 0.04%, more preferably 0.05%. Further, the upper limit of the content of Ti is preferably set to be 0.09%, more preferably 0.08%.

"Nb: Niobium" 0.008% to 0.06%

Nb is used to control the structure and perform precipitation strengthening of steel. Further, Nb is effective in preventing the formation of the network-like oxide formed in the superficial layer part during a hot-rolling step. However, when the content of Nb is less than 0.008%, there is no such effect; when the content of Nb exceeds 0.06%, the roughness of the punched part is increased and fatigue characteristics of the punched part are degraded. Accordingly, the appropriate range is limited to 0.008% to 0.6%.

Note that the lower limit of the content of Nb is preferably set to be 0.009%, more preferably 0.10%. Further, the upper limit of the content of Nb is preferably set to 0.055%, more preferably 0.05%.

"Total Amount of Si and Al"

Si and Al are elements that increase the ferrite fraction. By setting the total amount of Si and Al to be 0.8×(Mn−1) mass % or more, it becomes possible to secure an area ratio of ferrite of 50% or more, and to obtain favorable bending fatigue characteristics of the punched part. Further, by setting the total amount of Si and Al to be an appropriate value, it becomes possible to optimize the depth in the sheet thickness direction in which the network-like oxide formed in the superficial layer part is present, and to improve bending fatigue characteristics of the steel sheet. The upper limit of the total amount of Si and Al is not limited to a particular value, but the total amount of Si and Al exceeding 3.0% decreases toughness; accordingly, the total amount of Si and Al is preferably set to be 3.0% or less.

"Total Amount of Ti and Nb"

T is and Nb are used to make high-strength steel by forming an alloy carbide of an appropriate size. However, when the total amount of Ti and Nb is less than 0.04%, it becomes difficult to secure the maximum tensile strength of 720 MPa or more. On the other hand, when the total amount of Ti and Nb exceeds 0.14%, the roughness of the punched part is increased and fatigue characteristics of the punched part are degraded. Accordingly, the appropriate range of the total amount of Ti and Nb is limited to 0.04% to 0.14%.

In the present embodiment, as a constituent of steel, in addition to the above elements, the following elements may be selectively contained.

"V: Vanadium" 0% to 0.12%

In the present invention, V is not necessarily contained, but may be used to adjust the strength of steel. When the content of V is less than 0.01%, there is not such effect. Accordingly, in a case of containing V, the content of V is desirably set to be 0.01% or more. On the other hand, when the content of V exceeds 0.12%, the roughness of the punched end surface may be increased and fatigue characteristics of the punched part may be degraded. Accordingly, the content of V is set to be 0.12% or less.

"One or More of Cr, Cu, Ni, and Mo: 0% to 2.0% in Total"

In the present invention, Cr, Cu, Ni, and Mo are not necessarily contained, but may be used to control the structure of steel. When the total content of one or more of these elements is less than 0.02%, there is no effect accompanied by the addition; accordingly, in a case of containing one or more of these elements, the total content is desirably set to be 0.02% or more. On the other hand, when the total content of these elements exceeds 2.0%, coating corrosion resistance is decreased. Accordingly, the appropriate range of the total content of these elements is set to be 2.0% or less.

"B: Boron" 0% to 0.005%

In the present invention, B is not necessarily contained, but may be used to control the structure of the steel sheet. When the content of B is less than 0.0003%, there is no such effect; accordingly, in a case of containing B, the content of B is desirably set to be 0.0003% or more. On the other hand, when the content of B exceeds 0.005%, it may become difficult to secure 50% or more ferrite, and bending fatigue characteristics may be degraded. Accordingly, the content of B is set to be 0.005% or less.

"One or More of Ca, Mg, La, and Ce: 0% to 0.01% in Total"

In the present invention, Ca, Mg, La, and Ce are not necessarily contained, but may be used for deoxidation of steel. When the total amount of one or more of these elements is less than 0.0003%, there is no such effect; accordingly, in a case of containing one or more of these elements, the total content thereof is desirably set to be 0.0003% or more. On the other hand, when the total content thereof exceeds 0.01%, fatigue characteristics are degraded. Accordingly, the appropriate range of the total content of one or more of these elements is set to be 0.01% or less.

In the constituents of steel of the hot rolled steel sheet according to the present invention, the balance other than the above elements is Fe and impurities. The impurities are, for example, included in raw materials such as minerals and scraps, or included in a manufacturing process; however, there is no particular limitation. Any element may be contained as appropriate without damaging the function effect of the present invention.

<Steel Structure>

"Total Area Ratio of Martensite and Retained Austenite"

Martensite and retained austenite promote a ductile fracture in a locally deformed region of the punched part, and accordingly are effective in smoothing the roughness of the punched end surface in a precipitation-strengthened steel. That is, in the present invention aiming to increase fatigue characteristics of the punched part, martensite and retained austenite are significant parameters. Further, martensite and retained austenite are also effective in increasing stretch formability and ductibility.

When the total area ratio of martensite and retained austenite is less than 3%, there is no such effect. On the other hand, when the total area ratio of martensite and retained austenite exceeds 20%, the roughness of the punched end surface tends to be increased again. Accordingly, the appropriate range of the total area ratio of martensite and retained austenite is limited to 3% to 20%. The total area ratio of martensite and retained austenite is preferably set to be 5% or more, more preferably 7% or more. Further, the total area ratio of martensite and retained austenite is preferably set to be 18% or less, more preferably 15% or less.

As for martensite, tempered martensite is also effective in smoothing the punched end surface. Martensite includes so-called fresh martensite and tempered martensite.

Here, in a case in which martensite is compared with retained austenite, retained austenite has a little higher effect of reducing the roughness of the punched end surface, and accordingly, a certain amount of retained austenite is preferably contained. When the area ratio of retained austenite is less than 1%, the above effect is not exhibited explicitly; on the other hand, when the area ratio of retained austenite exceeds 6%, fatigue characteristics of the base material are decreased. Accordingly, the area ratio of retained austenite is preferably set to be 1% to 6%.

"Area Ratio of Ferrite"

In order to secure martensite or retained austenite, which contributes to the improvement of fatigue characteristics of the base material and the improvement of the roughness of the punched end surface, ferrite needs to be contained at an appropriate area ratio. When the area ratio of ferrite is less than 50%, it becomes difficult to set the above appropriate amount of martensite or retained austenite, and fatigue characteristics of the punched part are degraded. On the other hand, also in a case in which the area ratio of ferrite exceeds 96%, the roughness of the punched end surface is increased and bending fatigue characteristics of the punched part are degraded. Accordingly, the appropriate range of the area ratio of ferrite is limited to 50% to 96%. The lower limit of the ferrite fraction is preferably set to be 70% or more, more preferably 75% or more. Further, the area ratio of ferrite is preferably set to be 93% or less, more preferably 90% or less.

Note that ferrite mentioned here may be any of polygonal ferrite ($\alpha p$), pseudo polygonal ferrite ($\alpha q$), and granular bainitic ferrite ($\alpha B$) described in "Steel Bainite Photobook-1" The Iron and Steel Institute of Japan (1992) p. 4.

"Area Ratio of Pearlite"

Pearlite increases the roughness of the punched part. When the area ratio exceeds 3%, bending fatigue characteristics of the punched part tend to be degraded and the tensile strength tends to be decreased. Accordingly, the appropriate range is limited to 3% or less. The smaller amount of pearlite is more preferable, and its lower limit is 0%.

In the present invention, pearlite includes pearlite and pseudo pearlite.

Note that, in the hot rolled steel sheet of the present invention, the balance of the metal structure may be bainite. Here, the bainitic ferrite ($\alpha°B$) described in the above "Steel Bainite Photobook-1" The Iron and Steel Institute of Japan (1992) p. 4 is classified as bainite.

Area ratios of ferrite, bainite, pearlite, and martensite can be measured by using structure photographs obtained by photographing with an optical microscope or a scanning electronic microscope (SEM) by a point counting method or image analysis. The granular bainitic ferrite ($\alpha B$) and the bainitic ferrite ($\alpha°B$) are determined by structure observation with a SEM and a transmission electron microscope (TEM) on the basis of Reference Document 1. The fraction of retained austenite is measured by an X-ray diffraction method.

<Network-Like Oxide in the Superficial Layer Part>

The network-like oxide containing one or more of Si, Al, Mn, and Fe, formed during a hot-rolling step, in the superficial layer part of the steel sheet degrades bending fatigue characteristics and corrosion resistance after coating. When the thickness (depth) in the sheet thickness direction of the region where this network-like oxide is present is 0.5 µm or more, bendability, bending fatigue characteristics, and corrosion resistance after coating are degraded. Accordingly, the appropriate range is limited to 0.5 µm or less. Note that an oxide that has an influence on bendability and bending fatigue characteristics is the network-like oxide formed in the crystal grain boundary in the vicinity of the surface of the base material during the hot-rolling step, and does not include oxides that are formed during a pudding and molding step and dispersed evenly in the steel. Further, as for internal oxides (oxides precipitated inside a crystal grain), granular ones are also present in the superficial layer part, but are considered to have a smaller influence on bendability and bending fatigue characteristics than network-like ones precipitated in the crystal grain boundary of the base material. Accordingly, in the present invention, there is no particular limitation on the granular internal oxides, but there is a limitation on the network-like oxide formed in the crystal grain boundary in the superficial layer part.

<Average Grain Diameter of Alloy Carbide Containing Ti and Alloy Carbide Containing Nb>

An alloy carbide containing Ti and an alloy carbide containing Nb are precipitates that contribute to precipitation strengthening. However, when the average grain diameter exceeds 10 nm, it becomes difficult to secure the maximum tensile strength of 720 MPa or more, and accordingly, the appropriate range is desirably limited to 10 nm or less. Note that even when the alloy carbides contain a minute amount of N, V, and Mo, the effect of precipitation strengthening does not change. The alloy carbide containing Ti may contain N, V, and Mo in addition to Ti and C. Similarly, the alloy carbide containing Nb may contain N, V, and Mo in addition to Nb and C. Further, N, V, and Mo may be contained in addition to both Ti and Nb and C.

Note that the grain diameter of the alloy carbide containing Ti and that of the alloy carbide containing Nb are obtained by TEM-observation of a precipitate in a sample steel that is thinned by electropolishing or ion-polishing, or TEM-observation of a residue obtained by electroextraction, and calculation as equivalent circle grain diameter of 100 or more alloy carbides.

<Maximum Tensile Strength of Steel Sheet>

In the present invention, when the maximum tensile strength of a steel sheet is less than 720 MPa, the effect of reducing the weight of members becomes small. Accordingly, the range is set to be 720 MPa or more.

<Yield Ratio: 0.82 or Less>

For application to members of automobiles or trucks, which need fatigue characteristics, excellent stretch, stretch formability, and bendability are required. When a yield ratio YR, defined by YP/TS (YP: yield stress, TS: tensile strength), exceeds 0.82, in some cases, a fracture or a break is generated during formation and formation of members becomes unsuccessful. Accordingly, the yield ratio is preferably 0.82 or less.

[Method for Manufacturing High-Strength Hot Rolled Steel Sheet]

Next, a method for manufacturing the hot rolled steel sheet of the present invention will be described. The manufacturing method of the present invention is a method including: heating a slab consisting of the above constituent composition and sequentially performing rough rolling and final rolling; holding, from when descaling is performed before the final rolling until when the final rolling is finished, for three seconds or more, a state in which water (water on sheet) is not present on a surface of the steel sheet, and setting a finishing temperature of the final rolling to be 850° C. or more; performing cooling in which an average cooling speed between the finishing temperature of the final rolling and an $Ar_3$ temperature is 25° C./s or more, an average cooling speed between the $Ar_3$ temperature and 730° C. is 30° C./s or more, an average cooling speed between 730° C. and 670° C. is 12° C./s or less, and an average cooling speed between 670° C. and 550° C. is 20° C./s or more; and rolling up the hot rolled steel sheet at 530° C. or less.

First, the slab consisting of the above constituent composition is heated, and then rough rolling and final rolling are sequentially performed. At this time, conditions for heating the slab and conditions for rough rolling are not limited to particular conditions, and any of conditions that have been conventionally used can be employed.

In the present invention, water (water on sheet) that is present on the surface of the steel sheet from when descaling is performed before the final rolling until when the final rolling is finished is a significant factor having an influence on the formation of the network-like oxide in the superficial layer part of the steel sheet. In a final rolling step, usually, a high-pressure water used in descaling, water used for cooling rolling mills, and water for cooling the steel sheet between rolling mills are present on the surface of the steel sheet. When the state in which water is not present on the surface of the steel sheet for no more than three seconds from when descaling ends until when the final rolling is finished, excessive network-like oxides remains in the superficial layer part, and bending fatigue characteristics are degraded. Accordingly, the appropriate range of the time of holding the state in which water is not present on the surface of the steel sheet is set to be three seconds or more, preferably four seconds or more.

Note that there is no particular limitation on a method for achieving the state in which water is not present on the surface of the steel sheet and holding this state. For example, there is a method for removing moisture on the surface of the steel sheet by injecting a gas such as air to the traveling direction of the steel sheet from an intersecting direction (direction on the side surface side).

A finishing temperature FT of the final rolling is a significant manufacturing parameter to control oxidation behavior in the superficial layer part and a metal structure of the steel sheet. When the finishing temperature of the final rolling is less than 850° C., as the thickness of the network-like oxide in the superficial layer part is increased, it becomes more difficult to optimize the above described metal structure. Accordingly, in the present invention, the appropriate range of the finishing temperature of the final rolling is limited to 850° C. or more, preferably 870° C. or more.

The cooling speed between the finishing temperature FT of the final rolling and the $AR_3$ temperature is a significant manufacturing parameter having an influence on the microstructure and strength of steel. When the average cooling temperature between these temperatures is less than 25° C./s, the area ratio of ferrite cannot be optimized. Accordingly, the appropriate range of the average cooling speed between FT and the $AR_3$ temperature is set to be 25° C./s or more, preferably 45° C./s or more.

Note that the $AR_3$ temperature is calculated from the following expression (1).

$$Ar_3(° C.=910-310\times C+33(Si+Al)-80\times Mn-20\times Cu-15\times Cr-55\times Ni-80\times Mo \quad (1)$$

In the above expression (1), each atomic symbol denotes the content of each element (mass %)

The cooling speed between the $AR_3$ temperature and 730° C. is a significant manufacturing parameter having an influence on the formation of the network-like oxide in the superficial layer part. When the average cooling speed between these temperatures is less than 30° C./s, the depth in which the network-like oxide is formed from the surface becomes larger. Accordingly, in the present invention, the appropriate range of the average cooling speed between the $AR_3$ temperature and 730° C. is set to be 30° C./s or more, preferably 35° C./s or more.

The cooling speed between 730° C. and 670° C. is a significant manufacturing parameter for securing the area ratio of ferrite in steel. When the average cooling speed between these temperatures exceeds 12° C./s, it becomes difficult to secure 50% or more ferrite. Accordingly, the appropriate range is set to be 12° C./s or less, preferably 10° C./s or less.

The cooling speed between 670° C. and 550° C. is a significant manufacturing parameter for optimizing the area ratio of martensite and retained austenite. When the average cooling speed between these temperatures is less than 20° C./s, pearlite is formed and the roughness of the punched fracture surface is increased, resulting in degradation of fatigue characteristics of the punched part. Accordingly, in the present invention, the appropriate range is set to be 20° C./s or more, preferably 25° C./s or more.

Next, in the manufacturing method of the present invention, the temperature at the time of rolling up the steel sheet is a significant manufacturing parameter to obtain appropriate amounts of martensite and retained austenite. When the rolling-up temperature exceeds 530° C., appropriate amounts of martensite and retained austenite are not obtained, and pearlite is likely to be formed. As a result, the roughness of the punched fracture surface is increased and fatigue characteristics of the punched part are degraded. Accordingly, in the present invention, the appropriate range of the rolling-up temperature of the steel sheet is limited to 530° C. or less, preferably 510° C. or less.

Skin-pass rolling or leveler rolling is not necessary, but is effective in improving shape straightening, aging character, and fatigue characteristics, and may be performed after or before pickling, which will be described later. In a case of performing skin-pass rolling, the upper limit of rolling reduction is desirably set to be 3%. This is because the formability of the steel sheet is damaged when the upper limit exceeds 3%.

After hot-rolling is finished, pickling is performed, and black scale (scale) attached to the surface of the base material is removed. Pickling after the finish of hot-rolling is effective in removing some amount of network-like grain boundary oxides. However, unless the above manufacturing method is performed, it is difficult to reduce the thickness of the target network-like grain boundary oxide layer only by the pickling step after the finish of hot-rolling.

Next, the above hot rolled steel sheet may further be subjected to plating treatment or plating treatment followed by alloying the plated layer.

First, after the hot rolled steel sheet is pickled, the steel sheet is heated by using, for example, continuous galvanizing equipment or continuous annealing-galvanizing equipment. Next, the steel sheet is immersed in a plating bath to be subjected to hot dipping, so that a plated layer is formed on the surface of the hot rolled steel sheet.

In this case, when the heating temperature of the steel sheet exceeds 800° C., the metal structure of the steel sheet changed, and further, the thickness in the sheet thickness direction of the region containing the network-like oxide in the superficial layer part is increased, so that fatigue characteristics are not secured. Accordingly, the appropriate range of the heating temperature is limited to 800° C. or less.

Further, after hot dipping is performed, plating treatment followed by alloying the plated layer may be performed so that an alloyed hot dip galvanized layer can be formed.

Note that there is no particular limitation on the type of plating. Any type of plating may be performed as long as the upper limit of the heating temperature is 800° C. or less.

Next, methods for evaluating characteristics of the hot rolled steel sheet of the present invention will be described.

Bending fatigue characteristics of the hot rolled steel sheet of the present invention were evaluated by two-million-times fatigue limit (limit value of stress at which a fatigue fracture does not occur after repeated stresses of two millions of times) obtained by plane-bending fatigue tests under a condition of a stress ratio=−1 in accordance with a method described in JIS Z2275, and a fatigue limit ratio was calculated from {fatigue limit/TS(tensile strength)}. In the hot rolled steel sheet of the present invention, 0.45 or more fatigue limit ratio can be secured.

Further, fatigue characteristics of the punched part can be briefly evaluated by the following method.

That is, a bending test piece having a pierced hole in a central part is fabricated, and plate-bending fatigue tests are performed to evaluate the two-million-times fatigue limit or the fatigue limit ratio (=fatigue limit/TS). Here, in a case in which bending fatigue tests are performed by using a test piece having a width of 30 mm, which is obtained by punching a pierced hole under a condition of 10% clearance by using a brand-new punch of $\phi$ 10 mm, in the hot rolled steel sheet of the present invention, a 0.36 or more fatigue limit ratio can be secured. Further, a fatigue limit ratio of 0.39 or more is more preferable in the present invention.

Further, as for bendability of the steel sheet, tests were performed by a pressing bend method in accordance with a method described in JIS Z2248 with a bent angel of 180° and an inside radius of 1.5t (t is the sheet thickness of the steel sheet). In the hot rolled steel sheet of the present invention, it is possible to secure favorable bendability without a crack or fracture being observed in a bending front part.

As described above, according to the hot rolled steel sheet according to the present invention, by the above configuration, excellent bendability, coating corrosion resistance, and fatigue durability can be obtained. In conventional steel sheets, the sheet thickness of components has been set by taking into account the reduction in thickness by corrosion. By contrast, the hot rolled steel sheet of the present invention enables reduction of the sheet thickness of components because excellent coating corrosion resistance can be obtained, and enables reduction of the weight of automobiles, trucks, and the like. Further, in conventional steel sheets, even when high strengthening is performed, fatigue strength of the punched part has not been substantially improved. By contrast, the hot rolled steel sheet of the present invention has excellent bending fatigue characteristics of the base material and excellent fatigue characteristics of the punched part, and also has excellent bendability, and accordingly is excessively suitable for reduction of the weight of components.

Further, according to the method for manufacturing the hot rolled steel sheet of the present invention, by employing the above procedure and conditions, it becomes possible to manufacture the hot rolled steel sheet having the maximum tensile strength of 720 MPa or more with excellent bendability, corrosion resistance after electrodeposition coating, and fatigue durability.

Examples

Examples of the hot rolled steel sheet according to the present invention will be described below and the present invention will be described more specifically. Note that the present invention is not limited to the following examples, and may be implemented by appropriately applying modification without departing from the scope hereinabove or hereinbelow. Such implementation is also included in the technical scope of the present invention.

First, slabs having A to X steel constituents shown in Table 1 were cast, and then these slabs were heated again in the range of 1050° C. to 1300° C., and rough rolling was performed. Next, final rolling, cooling, rolling-up were performed under conditions shown in Table 2, so that hot rolled steel sheets were fabricated. Time periods of the state in which water was not present on the surface of the steel sheet from descaling before the final rolling until the finish of the final rolling, finishing temperature of the final rolling, cooling conditions, and rolling-up temperatures were varied. Next, pickling treatment was performed, and the steel sheets from the surface of which scale was removed were subjected to evaluation tests.

Further, as for test number A-12, the hot rolled steel sheet obtained as test number A-1 was subjected to picking, and then annealing treatment was performed at 650° C., and subsequently galvanization treatment was performed. As for test number A-13, the hot rolled steel sheet obtained as test number A-1 was subjected to picking, and then annealing treatment was performed at 600° C., and subsequently galvanization treatment and galvanization alloying treatment was performed.

Hot-rolled steel sheets of the present examples and hot rolled steel sheets of comparative examples, which were obtained through the above procedure, were subjected to evaluation tests described below. Note that alphabetical characters added to the top of "test number" shown in Table 2 correspond to steel symbols shown in Table 1.

Then, the hot rolled steel sheets of the present examples and the hot rolled steel sheets of the comparative examples, which were obtained through the above procedure, were subjected to evaluation tests described below.

Fatigue characteristics of the steel sheets were evaluated by two-million-times fatigue limit obtained by plane-bending fatigue tests under a condition of a stress ratio=−1 in accordance with the method described in JIS Z2275, and fatigue limit ratios were calculated from {fatigue limit/TS (tensile strength)}. Note that fatigue limit ratios of 0.45 or more were evaluated as favorable.

Fatigue characteristics of the punched parts were evaluated by two-million-times fatigue limit obtained by plane-bending fatigue tests, using bending test pieces having a pierced hole in a central part, under a condition of a stress ratio=−1 in accordance with the method described in JIS Z2275, and fatigue limit ratios were calculated from {fatigue limit/TS(tensile strength)}. Here, the punching process to provide pierced holes was performed under a condition of 10% clearance by using a brand-new punch of $\phi$ 10 mm. Note that fatigue limit ratios of 0.39 or more were evaluated as favorable fatigue characteristics of the punched parts.

Bendability of the steel sheets were evaluated by tests performed by a pressing bend method in accordance with the method described in JIS Z2248 with a bent angel of 180° and an inside radius of 1.5t (t is the sheet thickness of the steel sheet) by extracting test pieces in a manner that the longitudinal direction of the test piece becomes perpendicular to the rolling direction. Test pieces in which a crack or a fracture was not observed in the bending front part were evaluated as A (favorable).

Tensile characteristics of the steel sheets were evaluated by tension tests performed by extracting a JIS No. 5 test piece from each of the steel sheets under a condition in which the tension direction is perpendicular (C direction) to the rolling direction.

Metal structures along cross sections of the steel sheets were observed with a SEM, and the average values in three or more observed regions were determined as the thickness of the region where the network-like oxide is present in the superficial layer part of the steel sheet.

As for coating corrosion resistance, first, pickled hot rolled steel sheets were degreased, and then were subjected to zinc phosphate treatment (chemical conversion coating) as pre-treatment, and 25-μm-thick cation electrodeposition coating was performed, and finally baking treatment was performed at 170° C. for twenty minutes. Then, after linear flaws were added to the surface of electrodeposition coating, salt spray tests (SST tests) were performed for 200 hours in accordance with a method described in JIS Z2371. After the tests, peeled widths of coating films when tape peel tests were performed were measured. Peeled widths of coating films of 2 mm or less were evaluated as "A (favorable corrosion resistance)", and peeled widths of coating films of more than 2 mm were evaluated as "B (poor corrosion resistance)".

Table 1 shows the list of steel constituents and Table 2 shows the list of evaluation results of the thickness of the network-like oxide from the surface, bending fatigue characteristics, fatigue characteristics of the punched parts, tensile strength (TS), yield ratio, and bendability of the fabricated hot rolled steel sheets. Note that indices in Table 2 denote the following items.

t: time period during which water is not present on the steel sheet from descaling until the finish of the final rolling (seconds)
FT: finishing temperature of the final rolling (° C.)
CR1: average cooling speed between FT and $Ar_3$ temperature (° C./s)
CR2: average cooling speed between $Ar_3$ temperature and 730° C. (° C./s)
CR3: average cooling speed between 730° C. and 670° C. (° C./s)
CR4: average cooling speed between 670° C. and 550° C. (° C./s)
CT: rolling-up temperature (° C.)
$d_{MC}$: average grain diameter of an alloy carbide containing Ti and an alloy carbide containing Nb (nm)
$f_F$: area ratio of ferrite (%)
$f_M$: area ratio of martensite (%)
$f_\gamma$: volume fraction of retained austenite (%)
$f_P$: area ratio of pearlite (%)
hox: thickness in the sheet thickness direction of the region where the network-like oxide is present in the superficial layer part (μm)
EL: entire stretch of the steel sheet (%)
σw/TS: fatigue limit ratio
σwp/TS: fatigue limit ratio of the test piece with a pierced hole

TABLE 1

| Steel Symbols | Steel Constituents (mass %) | | | | | | | | | | | | $Ar_3$ (° C.) | Category |
|---|---|---|---|---|---|---|---|---|---|---|---|---|---|---|
| | C | Si | Al | Mn | P | S | N | Ti | Nb | Si + Al | Ti + Nb | Others | | |
| A | 0.08 | 0.1 | 1.5 | 2.0 | 0.010 | 0.003 | 0.003 | 0.08 | 0.01 | 1.6 | 0.09 | | 778 | |
| B | 0.13 | 0.1 | 2.0 | 2.4 | 0.010 | 0.001 | 0.003 | 0.04 | 0.06 | 2.1 | 0.1 | V: 0.06 | 747 | |
| C | 0.10 | 0.1 | 1.0 | 2.0 | 0.010 | 0.002 | 0.003 | 0.05 | 0.03 | 1.1 | 0.08 | Mo: 0.2 | 739 | |
| D | 0.06 | 0.1 | 0.8 | 1.3 | 0.010 | 0.002 | 0.003 | 0.07 | 0.01 | 0.9 | 0.08 | Mg: 0.003 | 817 | |
| E | 0.05 | 0.1 | 0.6 | 1.2 | 0.010 | 0.002 | 0.003 | 0.04 | 0.05 | 0.7 | 0.09 | La: 0.0004, Ce: 0.0015 | 822 | |
| F | 0.13 | 0.1 | 1.2 | 1.8 | 0.010 | 0.002 | 0.003 | 0.03 | 0.06 | 1.3 | 0.09 | V: 0.1, Mo: 0.25, Cr: 0.3 | 769 | |
| G | 0.06 | 0.2 | 0.8 | 1.3 | 0.010 | 0.003 | 0.003 | 0.09 | 0.01 | 1.0 | 0.1 | B: 0.001, Ca: 0.0015 | 820 | |
| H | 0.10 | 0.1 | 0.7 | 1.9 | 0.010 | 0.003 | 0.003 | 0.09 | 0.03 | 0.8 | 0.12 | Cu: 0.1, Ni: 0.3 | 734 | |
| I | <u>0.04</u> | 0.1 | 1.0 | 2.0 | 0.010 | 0.002 | 0.003 | 0.05 | 0.03 | 1.1 | 0.08 | | 774 | |
| J | <u>0.18</u> | 0.1 | 1.0 | 2.0 | 0.010 | 0.002 | 0.003 | 0.05 | 0.03 | 1.1 | 0.08 | | 731 | |
| K | 0.10 | <u>0.3</u> | 1.0 | 2.0 | 0.010 | 0.002 | 0.003 | 0.05 | 0.03 | 1.3 | 0.08 | | 762 | |
| L | 0.10 | 0.1 | 0.6 | 2.0 | 0.010 | 0.002 | 0.003 | 0.05 | 0.03 | <u>0.7</u> | 0.08 | | 742 | |
| M | 0.10 | 0.1 | <u>3.2</u> | 2.0 | 0.010 | 0.002 | 0.003 | 0.05 | 0.03 | <u>3.3</u> | 0.08 | | 828 | |
| N | 0.10 | 0.1 | 1.2 | <u>2.6</u> | 0.010 | 0.002 | 0.003 | 0.05 | 0.03 | 1.3 | 0.08 | | 714 | |
| O | 0.10 | 0.1 | 1.0 | 2.0 | <u>0.12</u> | 0.002 | 0.003 | 0.05 | 0.03 | 1.1 | 0.08 | | 755 | |
| P | 0.10 | 0.1 | 1.0 | 2.0 | 0.010 | <u>0.02</u> | 0.003 | 0.05 | 0.03 | 1.1 | 0.08 | | 755 | |
| Q | 0.10 | 0.1 | 1.0 | 2.0 | 0.010 | 0.002 | <u>0.008</u> | 0.05 | 0.03 | 1.1 | 0.08 | | 755 | |
| R | 0.10 | 0.1 | 1.0 | 2.0 | 0.010 | 0.002 | 0.003 | <u>0.12</u> | 0.03 | 1.1 | <u>0.15</u> | | 755 | |
| S | 0.10 | 0.1 | 1.0 | 2.0 | 0.010 | 0.002 | 0.003 | <u>0.01</u> | 0.03 | 1.1 | 0.04 | | 755 | |
| T | 0.10 | 0.1 | 1.0 | 2.0 | 0.010 | 0.002 | 0.003 | 0.05 | <u>0.07</u> | 1.1 | 0.12 | | 755 | |
| U | 0.10 | 0.1 | <u>0.4</u> | 1.2 | 0.010 | 0.002 | 0.003 | 0.05 | 0.03 | 0.5 | 0.08 | | 800 | |
| V | 0.10 | 0.1 | 1.0 | <u>1.1</u> | 0.010 | 0.002 | 0.003 | 0.05 | 0.03 | 1.1 | 0.08 | | 827 | |
| W | 0.10 | 0.1 | 1.0 | 2.0 | 0.010 | 0.002 | 0.003 | 0.05 | <u>0.002</u> | 1.1 | 0.05 | | 755 | |
| X | 0.10 | 0.1 | 1.0 | 2.0 | 0.010 | 0.002 | 0.003 | 0.03 | 0.008 | 1.1 | <u>0.038</u> | | 755 | |

TABLE 2

| Test Numbers | t (s) | FT (° C.) | CR1 (° C./s) | CR2 (° C./s) | CR3 (° C./s) | CR4 (° C./s) | CT (° C.) | Note | $d_{MC}$ (nm) | $f_F$ (%) | $f_\gamma$ (%) | $f_M + f_\gamma$ (%) | $f_P$ (%) |
|---|---|---|---|---|---|---|---|---|---|---|---|---|---|
| A-1 | 5 | 900 | 50 | 50 | 8 | 30 | 450 | | 5 | 80 | 4 | 8 | 0 |
| A-2 | 10 | 900 | 50 | 50 | 8 | 30 | 450 | | 5 | 80 | 4 | 8 | 0 |
| A-3 | <u>1</u> | 900 | 50 | 50 | 8 | 30 | 450 | | 5 | 80 | 4 | 8 | 0 |
| A-4 | 5 | <u>830</u> | 50 | 50 | 8 | 30 | 450 | | 5 | 85 | 4 | 9 | 0 |
| A-5 | 5 | 900 | <u>20</u> | 50 | <u>20</u> | 30 | 450 | | 5 | <u>45</u> | 2 | 4 | 0 |
| A-6 | 5 | 900 | 50 | 50 | 8 | <u>4</u> | 450 | | 5 | 80 | 1 | <u>2</u> | <u>4</u> |
| A-7 | 5 | 900 | 50 | 50 | 8 | 30 | <u>580</u> | | <u>12</u> | <u>97</u> | 0 | <u>0</u> | 0 |
| A-8 | 5 | 900 | 50 | 50 | 8 | 40 | 300 | | 5 | 80 | 3 | 10 | 0 |
| A-9 | 5 | 900 | 50 | 50 | 8 | 60 | 20 | | 5 | 80 | 2 | 15 | 0 |
| A-10 | 5 | 900 | 50 | <u>25</u> | 8 | 30 | 450 | | 7 | 85 | 2 | 5 | 0 |
| A-11 | 5 | 900 | 50 | <u>8</u> | 8 | 30 | 450 | | 10 | 90 | 2 | <u>2</u> | 2 |
| A-12 | 5 | 900 | 50 | 35 | 8 | 30 | 450 | Annealed at 650° C. and then galvanized | 8 | 80 | 2 | 7 | 0 |
| A-13 | 5 | 900 | 50 | 35 | 8 | 30 | 450 | Annealed at 600° C. and then alloyed galvanized | 8 | 80 | 2 | 7 | 0 |
| B-1 | 5 | 930 | 45 | 35 | 8 | 30 | 450 | | 6 | 75 | 3 | 15 | 0 |
| B-2 | 5 | 930 | 45 | 35 | 8 | 60 | 20 | | 6 | 75 | 2 | 18 | 0 |
| C-1 | 5 | 880 | 55 | 35 | 8 | 30 | 500 | | 5 | 80 | 3 | 9 | 0 |
| C-2 | 5 | 880 | 55 | 35 | 8 | 60 | 20 | | 5 | 80 | 2 | 15 | 0 |
| D-1 | <u>1</u> | 880 | 55 | 35 | 8 | 60 | 20 | | 4 | 90 | 0 | 8 | 0 |
| D-2 | 5 | 880 | 55 | 35 | 8 | 60 | 20 | | 4 | 90 | 0 | 8 | 0 |
| D-3 | 5 | 880 | 55 | <u>25</u> | 8 | 60 | 20 | | 4 | 92 | 0 | 5 | 1 |

TABLE 2-continued

| | | | | | | | | | | | | |
|---|---|---|---|---|---|---|---|---|---|---|---|---|
| D-4 | 5 | 880 | 55 | <u>8</u> | 8 | 60 | 20 | 4 | 93 | 0 | 3 | 2 |
| E-1 | 5 | 900 | 50 | 50 | 8 | 60 | 20 | 5 | 90 | 0 | 7 | 0 |
| F-1 | 5 | 900 | 50 | 50 | 8 | 30 | 450 | 5 | 75 | 4 | 12 | 0 |
| G-1 | 5 | 900 | 50 | 40 | 8 | 60 | 20 | 5 | 90 | 1 | 8 | 0 |
| H-1 | 5 | 900 | 50 | 40 | 8 | 30 | 450 | 5 | 80 | 1 | 6 | 0 |
| I-1 | 5 | 900 | 50 | 40 | 8 | 30 | 450 | 5 | 80 | 0 | <u>2</u> | 0 |
| J-1 | 5 | 900 | 50 | 40 | 8 | 30 | 450 | 5 | 80 | 6 | 14 | <u>5</u> |
| K-1 | 5 | 900 | 50 | 40 | 8 | 30 | 450 | 5 | 85 | 4 | 11 | 0 |
| L-1 | 5 | 900 | 50 | 40 | 8 | 30 | 450 | 5 | <u>45</u> | 2 | 17 | 0 |
| M-1 | 5 | 900 | 50 | 40 | 8 | 30 | 450 | 5 | 70 | 3 | 8 | 0 |
| N-1 | 5 | 900 | 50 | 40 | 8 | 30 | 450 | 5 | <u>30</u> | 1 | 15 | 0 |
| O-1 | 5 | 900 | 50 | 40 | 8 | 30 | 450 | 5 | 80 | 3 | 9 | 0 |
| P-1 | 5 | 900 | 50 | 40 | 8 | 30 | 450 | 5 | 75 | 1 | 8 | 0 |
| Q-1 | 5 | 900 | 50 | 40 | 8 | 30 | 450 | 5 | 80 | 3 | 10 | 0 |
| R-1 | 5 | 900 | 50 | 40 | 8 | 30 | 450 | 5 | 80 | 2 | 8 | 0 |
| S-1 | 5 | 900 | 50 | 40 | 8 | 30 | 450 | 5 | 85 | 3 | 10 | <u>4</u> |
| T-1 | 5 | 900 | 50 | 40 | 8 | 30 | 450 | 5 | 80 | 3 | 10 | 0 |
| U-1 | 5 | 900 | 50 | 40 | 8 | 30 | 450 | 5 | <u>40</u> | 0 | <u>21</u> | 0 |
| V-1 | 5 | 900 | 50 | 40 | 8 | 30 | 450 | 5 | 80 | 0 | <u>2</u> | <u>6</u> |
| W-1 | 5 | 900 | 50 | 40 | 8 | 30 | 450 | 5 | 80 | 3 | 9 | 0 |
| X-1 | 5 | 900 | 50 | 40 | 8 | 30 | 450 | 5 | 80 | 3 | 9 | 0 |

| Test Numbers | Note (structure) | hox (μm) | YP (MPa) | TS (MPa) | YR | EL (%) | σw/TS | σwp/TS | Corrosion resistance after coating | Bendability | Category |
|---|---|---|---|---|---|---|---|---|---|---|---|
| A-1 | | 0.4 | 620 | 800 | 0.78 | 22 | 0.51 | 0.42 | A | A | Present Example |
| A-2 | | 0.0 | 620 | 800 | 0.78 | 22 | 0.52 | 0.42 | A | A | Present Example |
| A-3 | | <u>3.0</u> | 620 | 800 | 0.78 | 22 | <u>0.42</u> | <u>0.33</u> | B | B | Comparative Example |
| A-4 | | <u>2.2</u> | 600 | 780 | 0.77 | 22 | <u>0.44</u> | <u>0.35</u> | B | B | Comparative Example |
| A-5 | | 0.4 | 710 | 845 | 0.84 | 19 | 0.49 | <u>0.35</u> | A | A | Comparative Example |
| A-6 | | 0.4 | 655 | 740 | 0.89 | 25 | 0.49 | <u>0.35</u> | A | A | Comparative Example |
| A-7 | | 0.4 | 745 | 825 | 0.90 | 20 | 0.47 | <u>0.34</u> | A | A | Comparative Example |
| A-8 | | 0.4 | 640 | 825 | 0.78 | 21 | 0.49 | 0.40 | A | A | Present Example |
| A-9 | | 0.4 | 655 | 870 | 0.75 | 18 | 0.49 | 0.40 | A | A | Present Example |
| A-10 | | <u>0.6</u> | 630 | 775 | 0.81 | 22 | <u>0.44</u> | <u>0.35</u> | B | B | Comparative Example |
| A-11 | | <u>0.9</u> | 595 | 720 | 0.83 | 23 | <u>0.44</u> | <u>0.31</u> | B | B | Comparative Example |
| A-12 | Martensite is tempered martensite. | 0.4 | 605 | 790 | 0.77 | 21 | 0.48 | 0.41 | A | A | Present Example |
| A-13 | Martensite is tempered martensite. | 0.4 | 630 | 805 | 0.78 | 18 | 0.48 | 0.41 | A | A | Present Sample |
| B-1 | | 0.3 | 650 | 840 | 0.77 | 19 | 0.49 | 0.40 | A | A | Present Example |
| B-2 | | 0.3 | 740 | 915 | 0.81 | 15 | 0.50 | 0.42 | A | A | Present Example |
| C-1 | | 0.3 | 620 | 780 | 0.79 | 22 | 0.48 | 0.41 | A | A | Present Example |
| C-2 | | 0.3 | 660 | 850 | 0.78 | 17 | 0.51 | 0.44 | A | A | Present Example |
| D-1 | | <u>2.5</u> | 630 | 785 | 0.80 | 23 | <u>0.42</u> | <u>0.36</u> | B | B | Comparative Example |
| D-2 | | 0.3 | 625 | 780 | 0.80 | 23 | 0.46 | 0.40 | A | A | Present Example |
| D-3 | | <u>0.6</u> | 605 | 760 | 0.80 | 24 | <u>0.44</u> | <u>0.35</u> | B | B | Comparative Example |
| D-4 | | <u>0.9</u> | 570 | <u>715</u> | 0.80 | 27 | <u>0.43</u> | <u>0.33</u> | B | B | Comparative Example |
| E-1 | | 0.0 | 605 | 760 | 0.80 | 19 | 0.47 | 0.39 | A | A | Present Example |
| F-1 | | 0.3 | 650 | 825 | 0.79 | 21 | 0.50 | 0.40 | A | A | Present Example |
| G-1 | | 0.0 | 660 | 860 | 0.77 | 17 | 0.47 | 0.41 | A | A | Present Example |
| H-1 | | 0.3 | 630 | 795 | 0.79 | 21 | 0.48 | 0.40 | A | A | Present Example |
| I-1 | | 0.3 | 580 | <u>700</u> | 0.83 | 26 | 0.50 | <u>0.35</u> | A | A | Comparative Example |
| J-1 | | 0.3 | 795 | 900 | 0.88 | 15 | 0.47 | <u>0.33</u> | A | A | Comparative Example |
| K-1 | | <u>2.5</u> | 635 | 805 | 0.79 | 23 | <u>0.42</u> | <u>0.33</u> | B | B | Comparative Example |
| L-1 | | 0.0 | 690 | 830 | 0.83 | 20 | 0.46 | <u>0.35</u> | A | A | Comparative Example |
| M-1 | | <u>2.8</u> | 620 | 790 | 0.78 | 20 | <u>0.42</u> | <u>0.35</u> | B | B | Comparative Example |
| N-1 | | <u>2.1</u> | 610 | 885 | 0.69 | 14 | <u>0.43</u> | <u>0.35</u> | B | B | Comparative Example |
| O-1 | | 0.3 | 705 | 840 | 0.84 | 17 | 0.50 | <u>0.33</u> | A | A | Comparative Example |
| P-1 | | 0.3 | 620 | 780 | 0.79 | 21 | 0.50 | <u>0.32</u> | A | A | Comparative Example |
| Q-1 | | 0.3 | 580 | <u>715</u> | 0.81 | 25 | 0.51 | 0.38 | A | A | Comparative Example |
| R-1 | | 0.0 | 745 | 875 | 0.85 | 18 | 0.50 | <u>0.33</u> | A | A | Comparative Example |
| S-1 | | <u>2.1</u> | 555 | <u>715</u> | 0.78 | 20 | <u>0.44</u> | 0.42 | B | B | Comparative Example |
| T-1 | | 0.0 | 630 | 795 | 0.79 | 22 | 0.49 | <u>0.35</u> | A | A | Comparative Example |
| U-1 | | 0.0 | 650 | 810 | 0.80 | 21 | 0.48 | <u>0.33</u> | A | A | Comparative Example |
| V-1 | | 0.3 | 580 | 720 | 0.81 | 24 | 0.46 | <u>0.33</u> | B | B | Comparative Example |
| W-1 | | <u>2.1</u> | 600 | 780 | 0.77 | 22 | <u>0.42</u> | <u>0.33</u> | B | B | Comparative Example |
| X-1 | | 0.6 | 565 | 735 | 0.77 | 25 | 0.50 | 0.39 | A | A | Comparative Example |

As shown in Table 2, each of the hot rolled steel sheets of the present examples, which are within the scope of the present invention, has a bending fatigue limit ratio of 0.45 or more, a bending fatigue limit ratio with a pierced hole of 0.39 or more, an "A" evaluation of corrosion resistance after coating, an "A" evaluation of bendability of and a tensile strength TS of the steel sheet of 720 MPa or more. Therefore, it is revealed that the hot rolled steel sheet of the present invention has excellent bendability, coating corrosion resistance, and bending fatigue characteristics of the steel sheet and the punched part.

By contrast, in each of the hot rolled steel sheets of the comparative examples, at least one of the above limits in the present invention is beyond the appropriate range. Therefore, at least one of bendability, coating corrosion resistance, and fatigue characteristics of the punched part is inferior.

As for test numbers A-3 and D-1, since the time period t during which water is not present on the steel sheet was short, the region where the network-like oxide is present in the superficial layer part is thick, bending fatigue characteristics of the steel sheet and the punched part are degraded, and corrosion resistance after coating is poor.

As for test number A-4, since the finishing temperature FT of the final rolling was less than or equal to the appropriate range, the region where the network-like oxide is present in the superficial layer part is thick, bending fatigue characteristics of the steel sheet and the punched part are degraded, and corrosion resistance after coating is poor.

As for test numbers K-1, M-1, N-1, S-1, and W-1, since the steel constituents were not appropriate, an oxide layer inside a base iron superficial layer is thick, bending fatigue characteristics of the original plate and the punched part are degraded, and corrosion resistance after coating is poor.

As for test numbers A-10, A-11, D-3, and D-4, since the cooling speed between $Ar_3$ and 730° C. was slow and the network-like oxide present in the superficial layer part was thick, bendability and fatigue characteristics are degraded.

As for test number A-5, since the cooling speed between FT and $Ar_3$ was slow and the cooling speed between 730° C. and 670° C. was fast, the ferrite fraction is low and bending fatigue characteristics of the punched part are degraded.

As for test numbers A-6, A-7, I-1, and V-1, since the area ratio of martensite and retained austenite was low, the roughness of the punched fracture surface is increased and bending fatigue characteristics of the punched part are degraded.

As for test numbers J-1, L-1, and U-1, since the steel constituents were not appropriate, any of the following is satisfied: the ferrite fraction is low, the area ratio of martensite and retained austenite is beyond the appropriate range, and the area ratio of pearlite is high. Accordingly, the roughness of the punched fracture surface is increased and bending fatigue characteristics of the punched part are degraded.

As for test numbers I-1, Q-1, and S-1, since the steel constituents were not appropriate, the maximum tensile strength (TS) is beyond the appropriate range.

As for test numbers O-1 and P-1, since the content of P or S was excessive, the roughness of the punched fracture surface is increased and bending fatigue characteristics of the punched part are degraded.

As for test numbers R-1 and T-1, since the content of Ti or Nb, or the total amount of Ti and Nb was excessive, the roughness of the punched fracture surface is increased and bending fatigue characteristics of the punched part are degraded.

As for test number X-1, although fatigue characteristics were favorable, since the total amount of Ti and Nb was too small, the maximum tensile strength (TS) is beyond the appropriate range.

From the above described results of the examples, according to the hot rolled steel sheet and the method for manufacturing the hot rolled steel sheet of the present invention, it is revealed that, even when electrodeposition coating is performed on a high-strength hot rolled steel sheet having a maximum tensile strength of 720 MPa or more, favorable bendability, favorable corrosion resistance, and bending fatigue characteristics of a base material and a punched part are obtained.

INDUSTRIAL APPLICABILITY

According to the present invention, for example, it becomes possible to provide a high-strength hot rolled steel sheet with excellent bendability, coating corrosion resistance, and fatigue characteristics of a base material and a punched part, which can be suitably used as a material of frames, members, chassis, and the like of automobiles or trucks. In this manner, by applying the present invention to members such as frames, members, chassis, and the like of automobiles or trucks, corrosion resistance after coating and fatigue strength of a punched member are increased. Further, an advantage of reduction of the weight can be sufficiently obtained, so that the industrial effects are extremely high.

REFERENCE SIGNS LIST 1 base material
1a surface
2 network-like oxide
3 scale

The invention claimed is:
1. A hot rolled steel sheet consisting of, in mass %,
C: 0.05% to 0.15%,
Si: 0% to 0.2%,
Al: 0.5% to 3.0%,
Mn: 1.2% to 2.5%,
P: 0.1% or less,
S: 0.01% or less,
N: 0.007% or less,
Ti: 0.03% to 0.10%,
Nb: 0.008% to 0.06%,
V: 0% to 0.12%,
one or more of Cr, Cu, Ni, and Mo: 0% to 2.0% in total,
B: 0% to 0.005%,
one or more of Ca, Mg, La, and Ce: 0% to 0.01% in total,
total amount of Si and Al: 0.8×(Mn−1)% or more,
total amount of Ti and Nb: 0.04% to 0.14%, and
the balance: Fe and impurities,
wherein, in a structure of steel, a total area ratio of martensite and retained austenite is 3% to 20%, an area ratio of ferrite is 50% to 96%, and an area ratio of pearlite is 3% or less, and
wherein, in a superficial layer part, the thickness in a sheet thickness direction of a region in which a network-shape oxide is present is equal to or less than 0.4 μm, and a maximum tensile strength is 720 MPa or more.
2. The hot rolled steel sheet according to claim 1, wherein an average grain diameter of an alloy carbide containing Ti and an alloy carbide containing Nb is 10 nm or less.
3. The hot rolled steel sheet according to claim 1, wherein a yield ratio is 0.82 or less.
4. The hot rolled steel sheet according to claim 1, consisting of, in mass %,
Si: 0.001% to 0.2%.
5. The hot rolled steel sheet according to claim 1, consisting of, in mass %,
V: 0.01% to 0.12%.
6. The hot rolled steel sheet according to claim 1, consisting of, in mass %,
one or more of Cr, Cu, Ni, and Mo: 0.02% to 2.0% in total.
7. The hot rolled steel sheet according to claim 1, consisting of, in mass %,
B: 0.0003% to 0.005%.
8. The hot rolled steel sheet according to claim 1, consisting of, in mass %,
one or more of Ca, Mg, La, and Ce: 0.0003% to 0.01% in total.

9. The hot rolled steel sheet according to claim 1, wherein a surface is plated or subjected to plating treatment followed by alloying the plated layer.

10. A method for manufacturing the hot rolled steel sheet according to claim 1, the method comprising:
heating a slab consisting of, in mass %,
C: 0.05% to 0.15%,
Si: 0% to 0.2%,
Al: 0.5% to 3.0%,
Mn: 1.2% to 2.5%,
P: 0.1% or less,
S: 0.01% or less,
N: 0.007% or less,
Ti: 0.03% to 0.10%,
Nb: 0.008% to 0.06%,
V: 0% to 0.12%,
one or more of Cr, Cu, Ni, and Mo: 0% to 2.0% in total,
B: 0% to 0.005%,
one or more of Ca, Mg, La, and Ce: 0% to 0.01% in total,
total amount of Si and Al: 0.8×(Mn−1)% or more,
total amount of Ti and Nb: 0.04% to 0.14%, and
the balance: Fe and impurities, and sequentially performing rough rolling and final rolling;
holding, from when descaling is performed before the final rolling until when the final rolling is finished, for three seconds or more, a state in which water is not present on a surface of the steel sheet, and setting a finishing temperature of the final rolling to be 850° C. or more;
performing cooling in which an average cooling speed between the finishing temperature of the final rolling and an $Ar_3$ temperature is 25° C./s or more, an average cooling speed between the $Ar_3$ temperature and 730° C. is 30° C./s or more, an average cooling speed between 730° C. and 670° C. is 12° C./s or less, and an average cooling speed between 670° C. and 550° C. is 20° C./s or more; and
rolling up the hot rolled steel sheet at 530° C. or less.

11. A method for manufacturing a hot rolled steel sheet, the method comprising:
pickling the hot rolled steel sheet obtained with the method according to claim 10, and then heating the hot rolled steel sheet at 800° C. or less and immersing the hot rolled steel sheet in a plating bath.

12. The method for manufacturing a hot rolled steel sheet according to claim 11, the method further comprising:
performing alloying treatment on a plated layer.

* * * * *